(12) United States Patent
Kaiser

(10) Patent No.: US 7,575,001 B2
(45) Date of Patent: Aug. 18, 2009

(54) SOLAR AND HEAT PUMP POWERED ELECTRIC FORCED HOT AIR HYDRONIC FURNACE

(75) Inventor: Stewart Kaiser, Boca Raton, FL (US)

(73) Assignee: J & H Solar LLC., Boca Raton, FL (US)

( * ) Notice: Subject to any disclaimer, the term of this patent is extended or adjusted under 35 U.S.C. 154(b) by 247 days.

(21) Appl. No.: 11/418,951

(22) Filed: May 5, 2006

(65) Prior Publication Data
US 2007/0277955 A1 Dec. 6, 2007

(51) Int. Cl.
*F24D 9/00* (2006.01)
(52) U.S. Cl. .................. 126/101; 126/99 E; 126/110 E; 126/110 R; 165/48.1; 165/48.2; 165/58; 237/2 B; 237/8 R; 237/19
(58) Field of Classification Search .................. 126/101, 126/99 R, 11 E; 237/2 B, 8 R, 16, 50, 81; 165/48.1, 48.2, 58, 104.11, 42, 50, 60; 122/20 R, 122/40; 454/243
See application file for complete search history.

(56) References Cited

U.S. PATENT DOCUMENTS

| | | | | | |
|---|---|---|---|---|---|
| 4,004,573 | A | * | 1/1977 | Frieling et al. | 126/615 |
| 4,314,547 | A | * | 2/1982 | Walsh | 126/611 |
| 4,375,806 | A | * | 3/1983 | Nishman | 126/585 |
| 5,060,722 | A | * | 10/1991 | Zdenek et al. | 165/170 |
| 6,026,804 | A | * | 2/2000 | Schardt et al. | 126/344 |
| 6,101,716 | A | * | 8/2000 | Schulz | 29/890.033 |
| 6,109,339 | A | * | 8/2000 | Talbert et al. | 165/48.1 |
| 2003/0051476 | A1 | * | 3/2003 | Reno | 60/641.8 |
| 2004/0025931 | A1 | * | 2/2004 | Aguglia | 136/246 |
| 2004/0207366 | A1 | * | 10/2004 | Sung | 320/140 |
| 2005/0072455 | A1 | * | 4/2005 | Gerhardinger et al. | 136/243 |
| 2008/0041362 | A1 | * | 2/2008 | Filippone | 126/567 |

* cited by examiner

*Primary Examiner*—Steven B McAllister
*Assistant Examiner*—Avinash Savani

(57) ABSTRACT

A furnace and method using a heat pump for providing domestic hot water and forced hot or cooled air utilizing heat pump achieved efficiency levels in an on-demand and unlimited domestic hot water, heating, and cooling system. In the heating mode, recycled air acquires heat from the heat pump's condenser coil and transfers this heat to the on-demand hot water.

8 Claims, 9 Drawing Sheets

Electric Forced Hot Air Hydronic Furnace

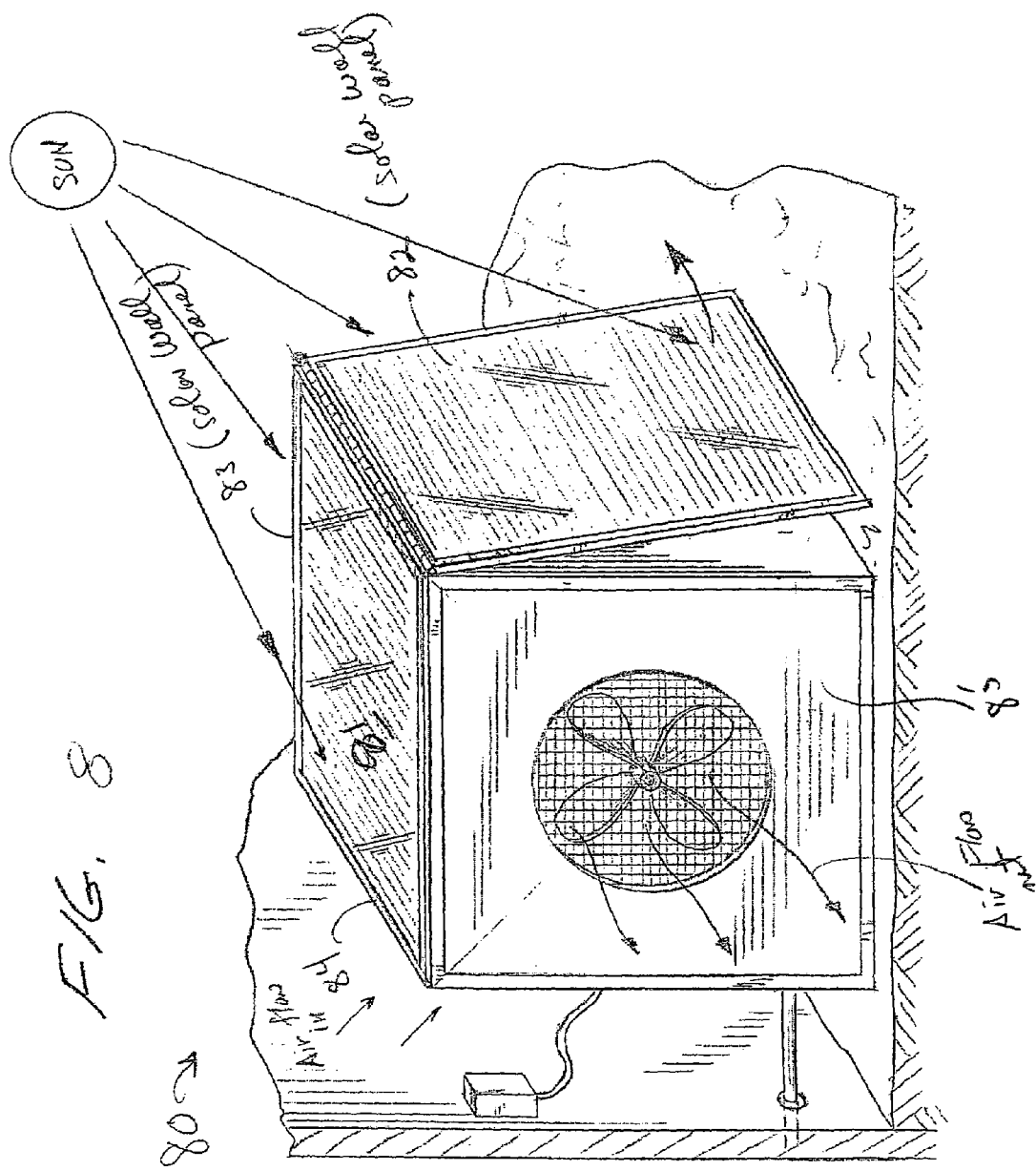

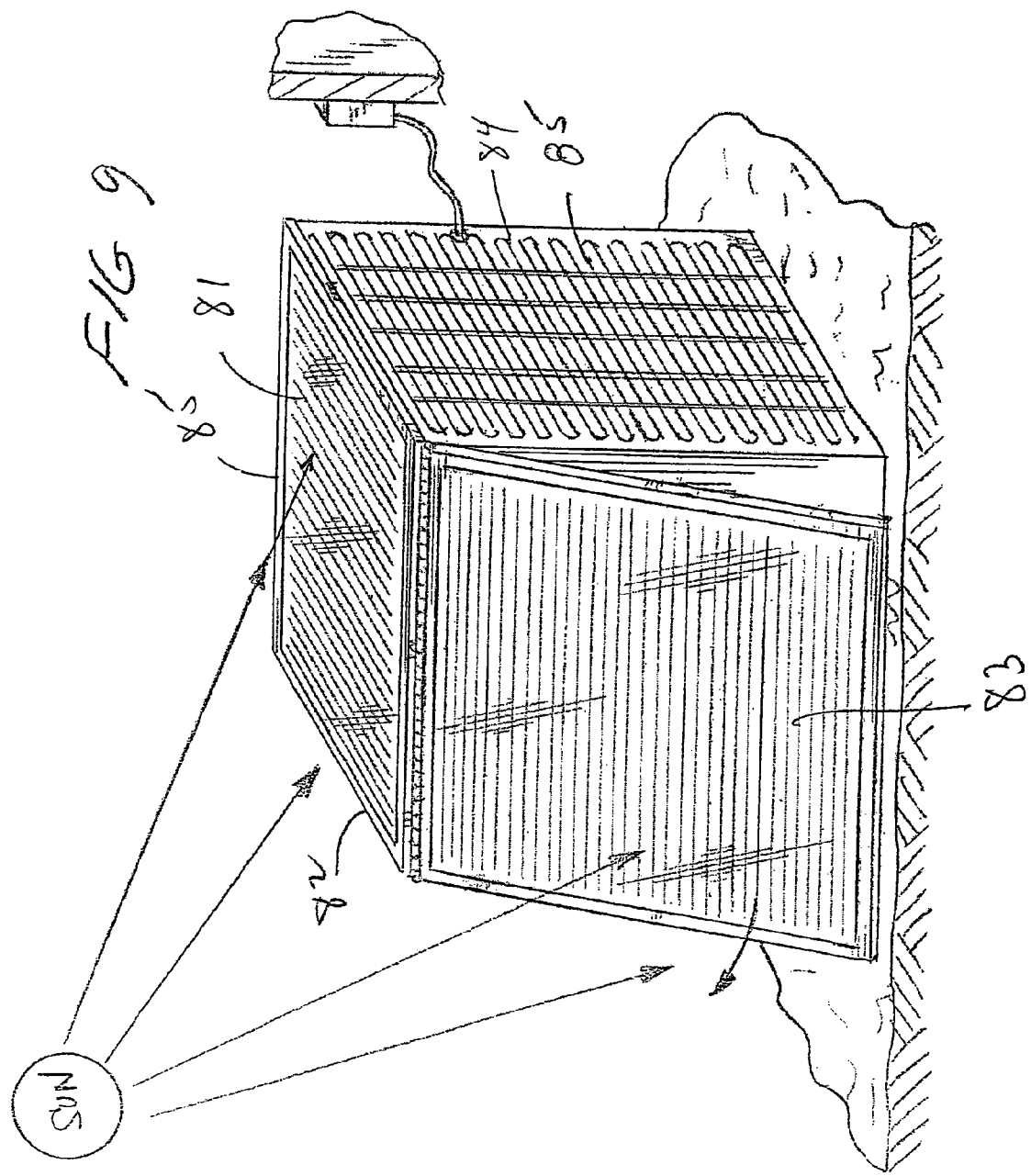

Note the large grain crystalline structure of the high efficiency cells and the improved energy collecting grid pattern which exposes more active material that is used in all Photowatt modules.

SOLAR AND HEAT PUMP POWERED ELECTRIC FORCED HOT AIR HYDRONIC FURNACE

1. CROSS REFERENCE TO RELATED APPLICATIONS

The instant non-provisional patent application invention claims priority from a provisional patent application sent via Express Mail ER 843203149 US and filed at PTO on May 10, 2005, entitled ELECTRIC FORCED HOT AIR HYDRONIC FURNACE.

2. BACKGROUND OF THE INVENTION

A. Field of the Invention

The present invention relates to solar panel energy systems and furnaces and furnace systems for providing forced air heating and cooling and providing hot water, and more particularly, for providing forced air heating and cooling and on-demand domestic hot water in conventional single family homes.

B. Description of the Prior Art

Prior art patents of interest include the U.S. Patent Numbers below, which are incorporated herein by reference thereto.

U.S. Pat. No. 4,125,151 issued to Hays et al. in November 1978; U.S. Pat. No. 4,171,772 issued to Hays et al. in October 1979; U.S. Pat. No. 4,274,581 issued to Hays et al. in June 1981; U.S. Pat. No. 4,293,093 issued to Raymond in October 1981; U.S. Pat. No. 4,796,437 issued to James in January 1989; U.S. Pat. No. 4,798,240 issued to Gerstmannetal in January 1989; U.S. Pat. No. 5,074,464 issued to Moore Jr. et al. in December 1991; U.S. Pat. No. 5,239,838 issued to Tressler in August 1993; U.S. Pat. No. 5,305,614 issued to Gilles in April 1994; U.S. Pat. No. 5,351,502 issued to Gillesetal in October 1994; U.S. Pat. No. 6,347,527 issued to Bailey et al. in February 2002; and U.S. Pat. No. 6,739,139 issued to Solomon in May 2004.

(1) Prior Art-Heating, Cooling and Hot Water Systems.

Conventional home heating ventilating, air conditioning—HVAC—, and hot water systems use fossil fuel furnaces, electrical resistance heaters, and combinations of these. For these conventional furnaces, which use combustible fuels to produce hot water and heated air for a home, fossil fuels—notably oil—have been experiencing dramatically increased costs. Furthermore, these furnaces operate in an energy wasteful manner. One aspect of this wasted energy occurs because a typical gas or oil-fired water heater stores between 40-100 gallons of hot water at 140° F. for 24 hours a day for an average home, while the home uses the hot water for less then one hour per day. Further undesirable aspects include: (a) the firing of oil, propane, or natural gas to heat homes releases harmful carbon monoxide and other pollutants into the environment; (b) much of the heat generated by the fuel rises up the chimney or flue and is wasted into outdoor air; and (c) the wasted heat adds to global warming.

Due to this increase in fossil fuel prices—in addition to an increase in overall electric consumption placing a toll on the power grids and the general inefficiencies of these systems—there has been a major interest in alternative methods and more efficient techniques of heating and cooling a house.

One of the best known approaches seeking to conserve energy and cost is to use an on-demand tankless or flash hot water heater, which heats only the water being used at the time of the demand and thus has no water storage tank and no cost to heat or maintain heated a large quantity of stored water. These tankless hot water heaters, however, still require heat from fossil fuel or from electricity, with the usual waste and efficiencies.

Another prior art system uses an air handler with a hot water coil. This technique, however, uses hot water produced by an oil or gas fired boiler to be fed through a coil to produce hot air, with the previously described waste in energy during the heating cycle.

Also known in the prior art are combined heating and cooling systems in which a warm air furnace has associated with it an air conditioning system having a cooling coil placed in the air duct. These systems, however, are essentially two complete systems, i.e., a hot air heater that is relatively large and bulky and a cooling coil from an independent cooling system.

It is also known to combine a refrigeration system and a hot water heating system to affect a transference of heat energy therebetween. For example, U.S. Pat. No. 4,293,093 teaches a refrigerant system and hot water heating arrangement, wherein the superheat of the refrigerant is rejected to water to be heated, such that this heat energy may be utilized to provide hot water. In effect, the '093 patent teaches the capturing of waste heat from a refrigerant and the subsequent use of the heat for a useful intended purpose. These techniques, as well as heat pumps employed to heat water, however, use liquid-to-liquid heat exchangers, as described in FIGS. 8 and 11 of U.S. Pat. No. 4,796,437. These methods also involve storing the water with the inherent loss of energy in the storage systems.

Tankless or on-demand unlimited domestic hot water systems have been limited to utilizing resistance electric or fossil fuels for the primary source of energy. While this technique saves considerable cost associated with producing domestic hot water by not having to store the heated water and absorbing the energy loss related to that method, it still requires traditional heat input with traditional inefficiencies.

3. SUMMARY OF THE INVENTION

The present invention is a high efficiency electric forced hot air hydronic furnace capable of producing within a system: (a) forced hot air heat more efficiently then conventional oil, gas, or electric furnaces; (b) unlimited domestic hot water without a storage tank; and (c) cooled air.

The present invention comprises numerous combinations and subcombinations of system components, with the first object of the invention being to provide for typical domestic homes, a new highly efficient and pollution free furnace for producing on-demand hot water.

It is a further object for this new furnace to also provide heating and cooling for the forced air ventilation system.

It is a still further object for this furnace to produce hot water with the extremely high energy and cost efficiency resulting from the incorporation of a heat pump into the hot water heating function.

In a preferred embodiment of the invention, the on-demand hot water is heated in a hydronic coil heat exchanger that received heat from an airflow that is heated by a condenser coil of the heat pump.

It is another object to combine this new furnace with an electric resistance flash heater, such that water will be heated by the flash heater only when there is insufficient heat from the heat pump and hydronic coil subcombination to satisfy the on-demand hot water requirements.

This new furnace is smaller in size then a standard furnace, and is still capable of producing all the heat, hot water, and air conditioning utilities required for an average home, without using combustible fuels, flues, or chimneys, and without producing emissions and carbon monoxide, this being achieved with extremely high efficiency and essentially no wasted heat.

This new furnace employs a technique of using heat pump efficiency transferred to an on-demand unlimited domestic hot water system. More specifically, this new technique combines the energy savings of an on-demand unlimited domestic hot water system with the energy efficiencies of a heat pump—the latter commonly exceeding fossil efficiencies by a three-to-one ratio—while using excess heat for heating air flow for the forced air system. The new technique, furthermore, has a cooling capability without utilizing a common heat exchanger.

The preferred embodiment of the invention comprises a compact combination hydronic forced hot air heating system, an air-cooling system, and an unlimited domestic hot water system. The invention will operate in several different and separate modes depending on the demand in the home for domestic hot water, heated, and/or cooled air.

In the heating mode, the system cycles in two separate and independent stages.

Stage One heating, which does no use the heat pump, activates the water pump, and then the circulating water activates the hydronic flash heater via a flow activation sequence. The flash heater is connected to a main water supply for producing on-demand hot water, but also has a closed loop flow path through the hydronic heating coil located on the top of the furnace. Approximately half a gallon of water is flash heated to about 160° F.-180° F. using electric elements within the core of the flash heater exchanger tubes. This hot water circulates through the hydronic coil and back to the heater to be re-flashed and so on. This method maintains a temperature between 160° F.-180° F. at the hydronic coil. The blower moves air across the coil where the air absorbs this heat and is then delivered into and through the home duct system.

Stage Two heating activates the heat pump, which provides heat to the domestic hot water via the airflow, which picked up heat from the heat pump's condenser coil. This method allows for an extremely efficient transfer of heat to a hydronic coil and thence to the water. Upon the flow of the domestic water supply created by opening any hot water faucet valve, the cold water from the main supply flows across the hydronic coil in which the heat originating from the heat pump is absorbed by the cold water. This is part of the on-demand technique in which the water then flows directly to the opened faucet.

Additional heating—if necessary to achieve desired domestic hot water temperature—is achieved by the flash heater; however, usually this requires only a small amount of energy. A thermostatic mixing valve assures a desired water temperature of about 105° F., thus reducing the risk of scalding or changing water temperatures caused by irregular water pressures.

This method of transferring heat pump created heat to an on-demand domestic hot water system will enable a home owner to heat water at a fraction of the cost of any other domestic water heating technique and to do so without waste or emissions.

Upon a request for air conditioning, the heat pump operates as a normal air conditioning unit, where the evaporation coil becomes cold, thus enabling the system to cool and dehumidify the air. In this air conditioning mode, when there is a call for domestic hot water, the flash heater will heat the water to the desired temperature and flow the water through the mixing valve without effecting the air conditioning cycle or radiating any of the heat created by the flash heater into the air stream. This is a accomplished by water pressure against a closed loop and a series of appropriate check valves.

In summary, this new method of super efficient heating, cooling, and domestic water heating from a single compact unit achieves the following objectives. This method requires only one free standing system, as opposed to three separate conventional systems, namely: (a) a furnace for forced hot air heating; (b) an air handler or coil for air conditioning; and (c) a hot water heater tank for domestic hot water. This new system thus significantly reduces space required for a mechanical room. Unlike a hot water tank, this new system allows for unlimited hot water without limitation or restriction by the amount of gallons stored or recovery capability. This new method saves a great deal of energy as compared to conventional systems, and there are no emissions and essentially no heat losses involved with this system. In addition to affording heat pump efficiency in an on-demand energy saving domestic hot water system, the new system provides adjusted and pre-regulated domestic hot water, regardless of the season or demands on the heating or air conditioning system.

In the preferred embodiment of this new system, the flash heater uses a small amount of water—usually less then one gallon—to be super heated to about 160° F. within seconds with very little power—usually less then 30 amps, 220V. This super heated hot water then circulates through a hot water coil within the furnace. At this time the blower motor is re-circulating the air through the duct system, across the coil, and into a tube restrictor, which compresses the air back through the coils, while heating the air within just a few degrees of the water, and creating a super efficient heat exchange. The air leaving the air chamber is between 120° F.-158° F. The water is then circulated back to the tankless heater strip approximately 30° F. cooler then the temperature it had on entering the air chamber. The flash heater uses only a small amount of energy to reheat the water to 160° F. With the system as thus described, essentially 100% of all the electrical energy entering the system is utilized, there is essentially no wasted energy, and a cost saving of up to 60%.

A. Background of Second Embodiment

The known art concerning conventional heat pumps and air conditioners is well documented and understood. These systems compress refrigerant and remove or transfer heat from one location to another. They are usually located on the ground outside of a building or structure or located on the roof. These units usually function on standard line voltage from a fused disconnect box attached to the unit.

Solar photocells and panel structures are well known and are usually installed on roofs or on ground level facing the sun. These systems usually store energy in batteries or convert the current from A/C to D/C using inverters. This method, however, is proving to be less practical due to the cost and space involved with capturing and storing the amount of energy required to supply enough electricity to sufficiently operate a standard house. Large panels take up a significant amount of space or real estate, making this method not very practical in city application. In addition most homeowners do not desire massive panels located on their roofs just for cosmetic reasons.

Also, the cost of installing an adequate solar system cannot be justified using the cost of kilowatts in today's market. For example, a standard solar system will cost about $30,000 and will produce approximately 10 kilowatts per day or about $0.50 worth of electricity.

B. Summary of the Second Embodiment

Combining solar technology based on net metering with the efficiency achieved by heat pump methodology, can create a tremendous amount of energy savings for a building or residence. The installation cost factor in most cases is $zero due to extensive incentives and rebates offered by local, state, and federal agencies.

Building the skin or body of a heat pump or air conditioning condensing unit out of efficient photocells, or cladding the outside surface of the unit with photocells, allows the unit to absorb energy from the sun and produce an electric current that is passed into a low voltage, low amperage inverter and back through the existing fused disconnect box already attached to the unit. This technique requires no more wiring or piping then a normal heat pump or A/C installation. By utilizing the line voltage lines normally installed on a heat pump or A/C system, the energy can be transferred back through the line through the fuse box and to the electric meter for instant use by the homeowner or for net metering, which virtually spins the electric meter backwards to store credits for the homeowner when he may need them. In addition, this technique of using the body of the heat pump or A/C to hold the solar panels eliminates the need to place solar panels on a roof or over large areas. It is unlikely that anyone would object to a heat pump or A/C that looks like a conventional system, outside his/her home. Also, placing the unit on the South side of a building in the Northern hemisphere, will allow for optimum efficiency of the photocells.

Storing credits with net metering allows the homeowner to have free electricity when he/she needs it the most during the summer or winter months. Also, utilizing the efficiency created by a heat pump or A/C allows these kilowatts that would usually be too little to make much difference in an electric bill to become a great asset when 1 KWH=10,000 BTUH of heat.

Utilizing the side of the heat pump or A/C facing the building as the condensing coil side, achieves the purpose of allowing the other three sides facing the sun full uninterrupted exposure. Using the side facing away from the South or sunny side to discharge the air achieves the same practical efficiency.

These and other objectives and advantages of the present invention will become apparent from the following description of the preferred embodiments and methods and the accompanying drawings.

4. BRIEF DESCRIPTION OF THE DRAWINGS

The figures of the drawing are briefly described as follows:

FIG. 8 is a top, front perspective view of a second embodiment of the present invention, which utilizes solar panels in combination with the heat pump;

FIG. 9 is top, rear perspective view of the unit of FIG. 8;

Figure 1:
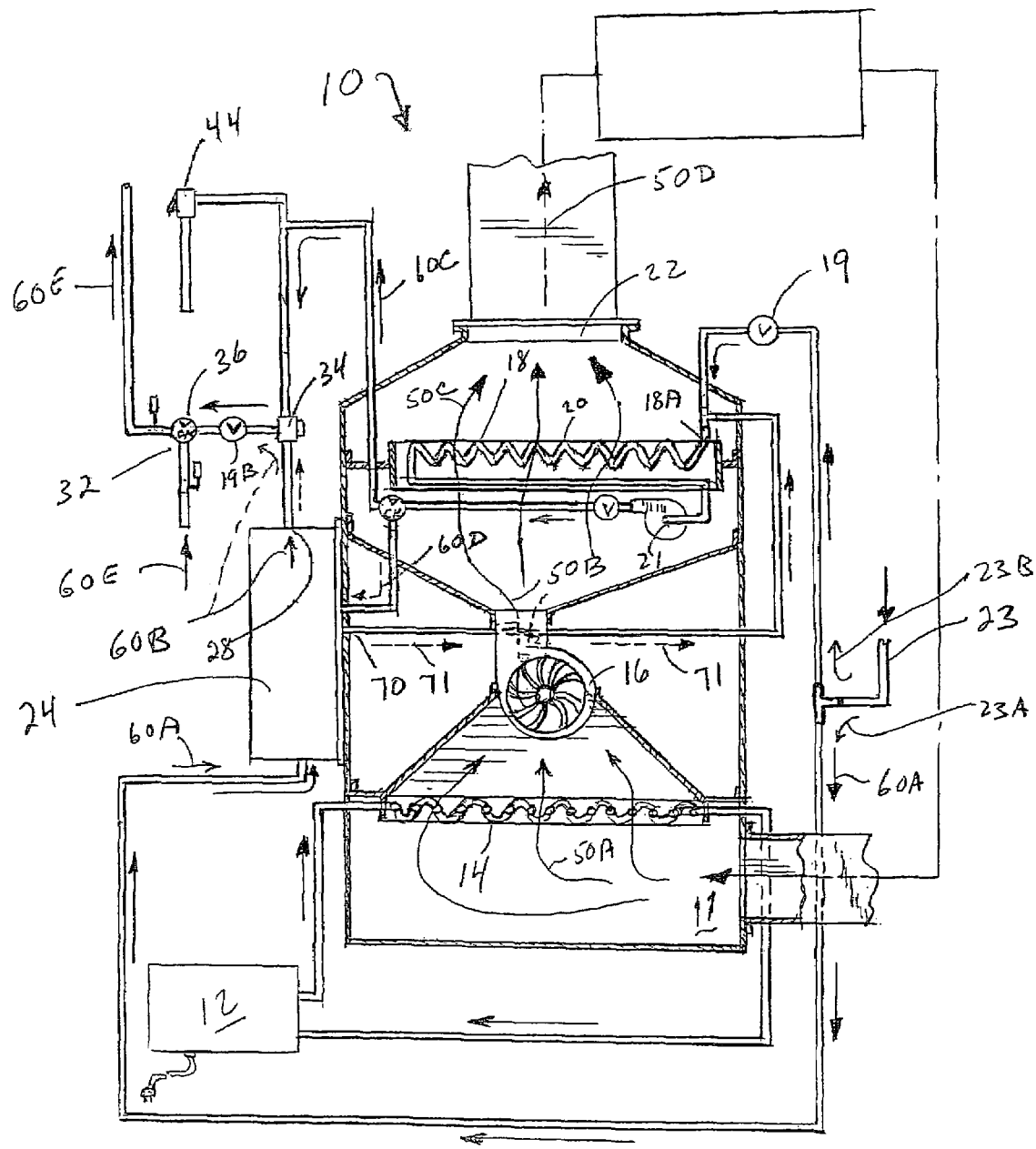
FIG. 1 is a schematic diagram of the present invention illustrating all the operating components, as well as the water and air directional flows.
Figure 1A:
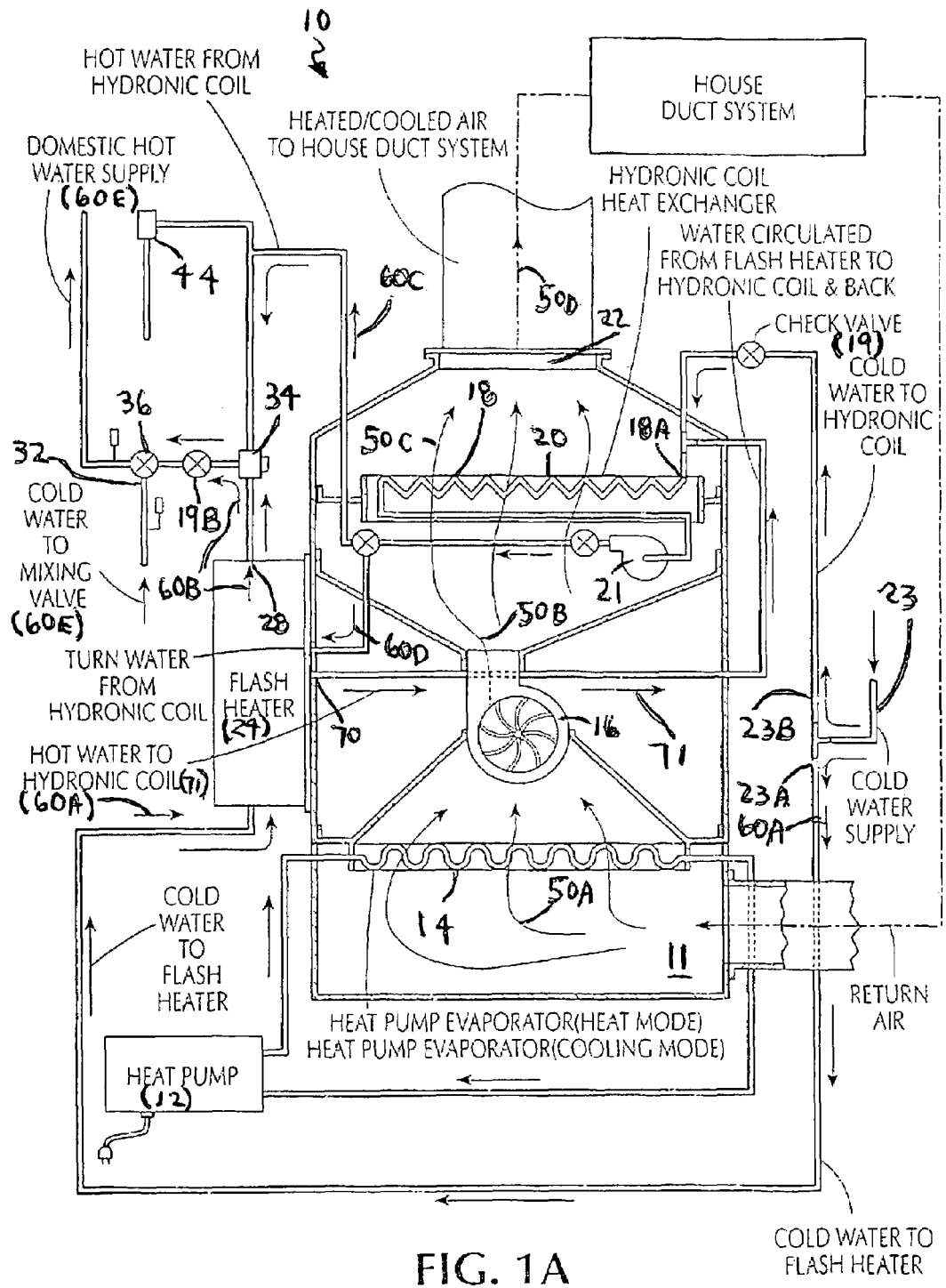
FIG. 1A is essentially the same as FIG. 1 with text added to describe components and functions.
Figure 5:
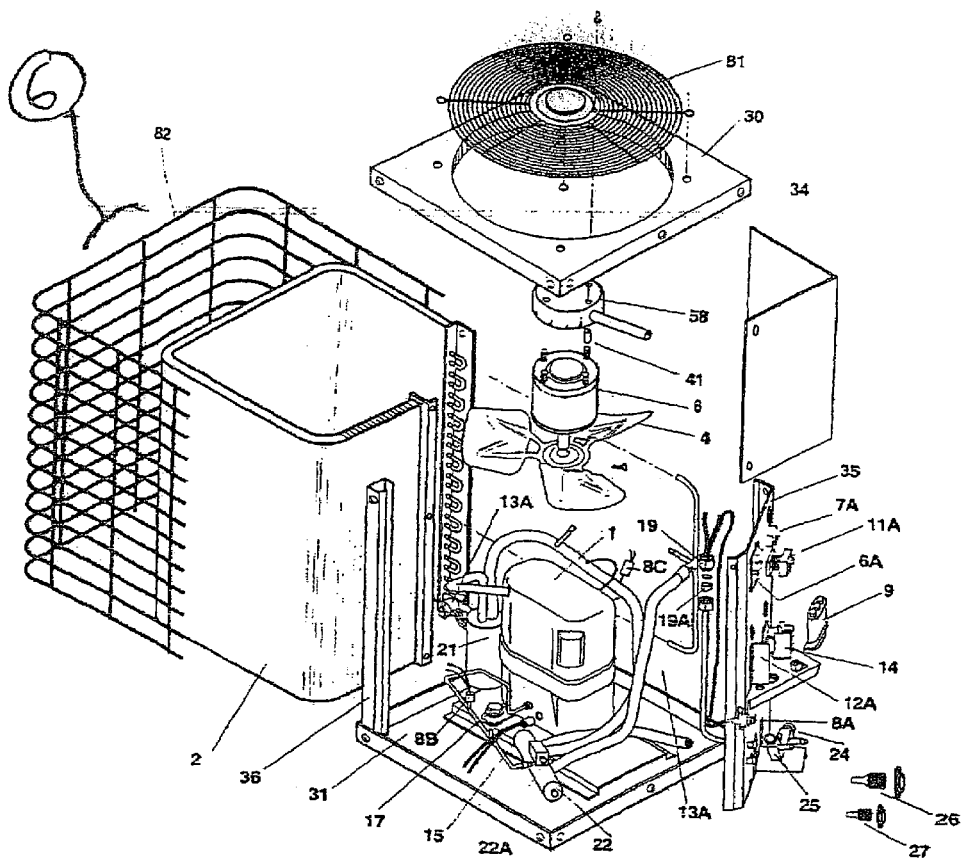
FIG. 5 is a schematic diagram of the heat pump.

While the invention has been described in conjunction with several embodiments, it is to be understood that many alternatives, modifications, and variations will be apparent to those skilled in the art in light of the foregoing description.

Accordingly, the invention is intended to embrace all such alternatives, modifications, and variations, which fall within the spirit and scope of the appended claims.

5. LIST OF REFERENCE NUMERALS UTILIZED IN THE DRAWING

| | |
|---|---|
| 10 | furnace |
| 11 | return air inlet |
| 12 | heat pump |
| 14 | condenser coil |
| 16 | blower |
| 18 | hydronic coil heat exchanger |
| 18A | hydronic coil heat exchanger |
| 19A | check valve in cold water pipe to hydronic coil 20 |
| 19B | check valve in hot water flow to mixing valve 36 |
| 20 | hydronic coil |
| 21 | water pump |
| 22 | forced air duct inlet |
| 23 | main cold water supply |
| 23A | cold water supply to flash heater 24 |
| 23B | cold water supply to hydronic coil 20 |
| 24 | flash heater |
| 26 | cold water inlet to flash heater 24 |
| 28 | hot water outlet from flash heater 24 |
| 34 | check valve for hot water from flash heater 24 and hot water from hydronic coil 20 |
| 36 | mixing valve for hot and cold water |
| 44 | pressure relief valve |
| 50A | return air flow path through condenser coil 14 |
| 50B | air flow path through blower 16 |
| 50C | air flow path through hydronic coil heat exchanger 18/18A |
| 50D | air flow path into forced air duct system |
| 60A | inlet cold water flow into flash heater 24 in pipe 23B from cold water source 23 |
| 60B | water flow path from flash heater 24 to domestic pipes |
| 60C | water flow path from hydronic coil 20 to domestic hot water supply |
| 60D | water flow from hydronic coil 20 back to flash heater 24 to be reheated |
| 60E | inlet cold water to domestic cold water supply |
| 60F | hot water flow for domestic needs |
| 70 | pipe |
| 71 | flow path |
| 80 | heat pump |
| 81 | top of heat pump 80 |
| 82 | side of heat pump 80 |
| 83 | side of heat pump 80 |
| 84 | side of heat pump 80 |
| 85 | side of heat pump 80 |

6. DETAILED DESCRIPTION OF THE PREFERRED EMBODIMENTS

For convenience and clarity in describing these embodiments, similar elements or components appearing in different figures will have the same reference numbers.

A. First Embodiment

FIGS. 1; 1A-7 illustrate a preferred embodiment of the new electric forced hot air hydronic furnace. FIG. 1 illustrates the overall system of the new furnace 10, except that the electrical and mechanical controls are omitted and shown in subsequent figures. The heat pump is represented schematically by the box marked 12, with its condensation coil heat exchanger 14 situated in the return airflow path indicated by ARROWS 50A. The airflow path is further shown by ARROW 50B through blower 16, ARROWS 50C through hydronic coil heat exchanger 18, and ARROW 50D into house duct system.

The water flow paths are indicated by cold water supply 23, which divides into pipe 23A feeding flash heater 24 and pipe 23B feeding hydronic coil 20. Water pump 21 directs the heated water through valve 21A, either up via path 60C to the domestic hot water system or via path 60D back to the flash heater 24 to be reheated and returned again to the hydronic coil 20.

Hot water flow 60B from the flash heater 24 or hot water in the flow 60C from the hydronic coil 20 passes through check valve 34 and thence to mixing valve 35 where cold water 60E is added as required to result in hot water that is not excessively or dangerously hot.

Figure 2:
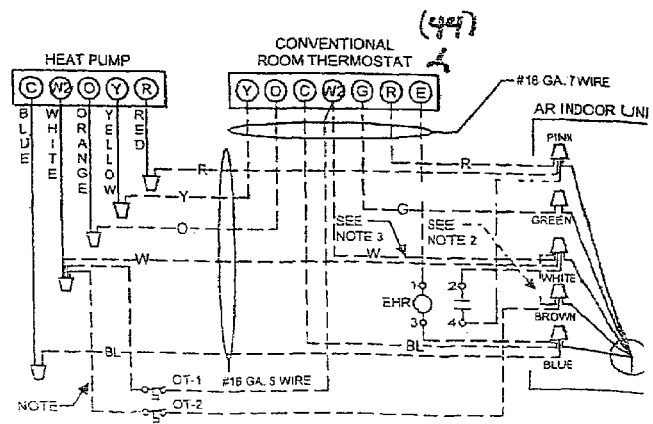
FIG. 2 is a low voltage wiring diagram for integrating the system into a typical multistage heat pump thermostat.
Figure 3:
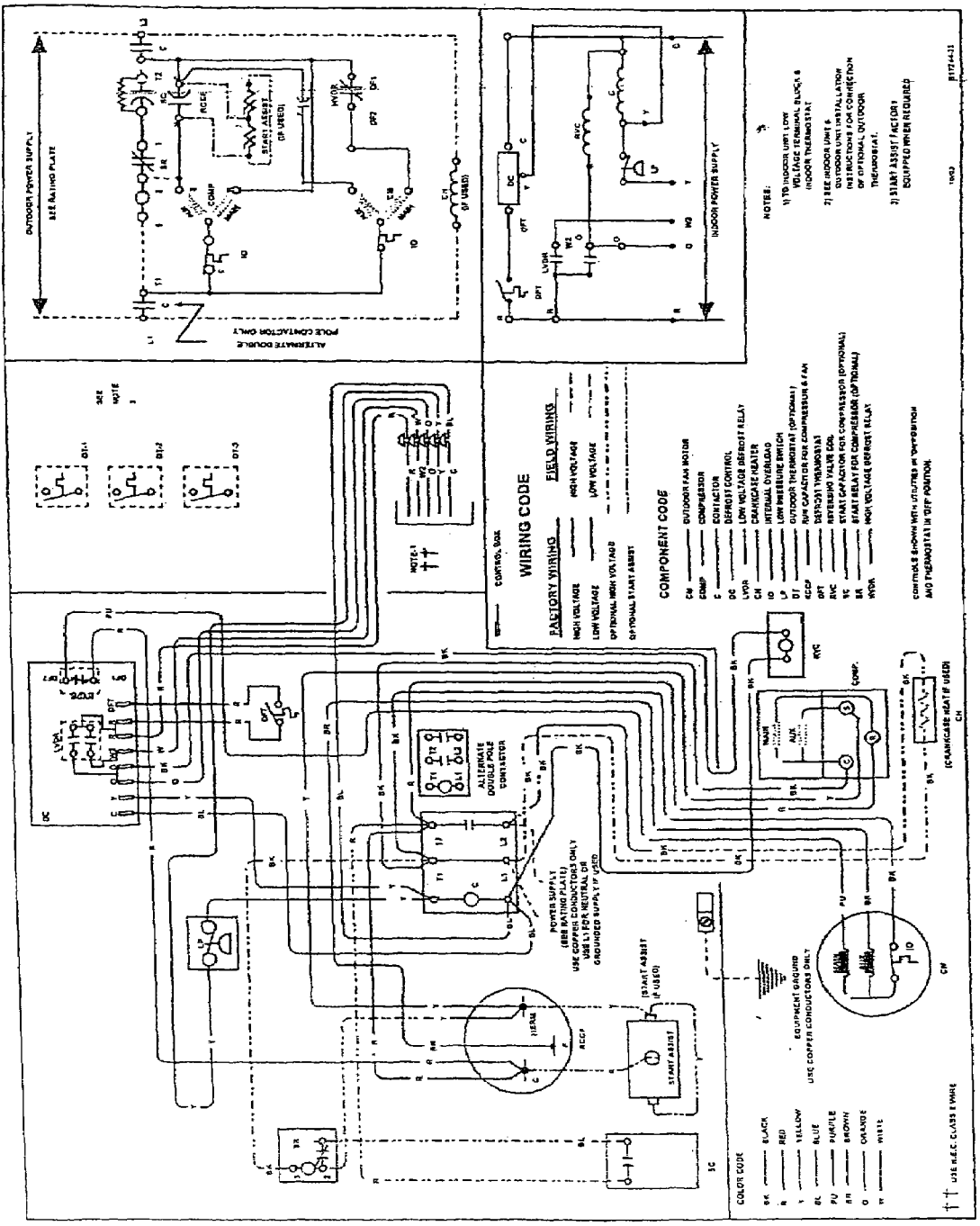
FIG. 3 is a wiring diagram for the heat pump.

Referring to FIG. 2, conventional room thermostat 44 calls for heat using low voltage wiring in a closed circuit. In Stage Two heating, terminal Y activates the heat pump 12 (FIG. 1), while terminal W2 activates the water pump 21 (FIG. 1). The flowing water in turn activates the flash heater 24. The water circulates through check valve 19A and through check valve 19B. This method assures there will not be feedback to the main water supply.

The water is heated as follows. The heat pump 12 transfers heat to the condensation coil 14. Air heated by the coil 14 is driven by the blower motor 16 across the hydronic coil 20. The residual air is then forced into duct supply 22 for forced air heating. Additional heat produced by the flash heater 24 is transferred into the hydronic coil heat exchanger 18 via pipe 70 and flow path 71. Heat is further absorbed by air passing through the hydronic coil 20 indicated by ARROW 50C.

Figure 7:
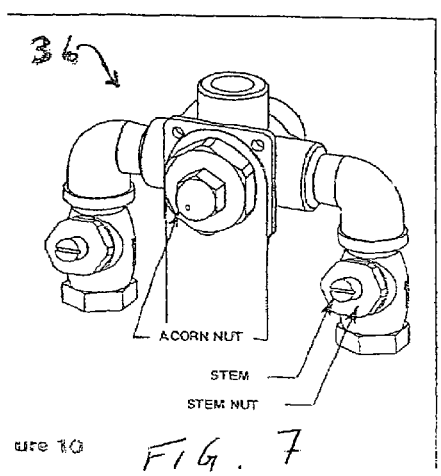
FIG. 7 shows a thermostatically controlled water mixing valve.

Upon a call for domestic hot water by way of a faucet handle being activated, the hot water will flow through mixing valve 36, which is also illustrated in FIG. 7. This valve 36 assures a constant temperature and flow rate. By this arrangement, heat from the heat pump 12 is transferred via the condenser coil 14 to the on-demand hot water supply via flow path 60G. Cold water flowing into the furnace via flow path 60A is continually being heated using this same method.

Upon a call for air conditioning from the conventional room thermostat 44 (FIG. 2), the condenser coil 14 becomes cold due to the heat pump operation. Air driven across the condenser coil 14 as indicated by ARROWS 50A caused by the fan blower 16 is cooled and dehumidified and forced into the duct supply 22.

Upon a call for domestic hot water, the flash heater 24 will flash heat the domestic hot water to a desirable temperature, at which time the water will flow through the mixing valve 36 assuring proper temperature and flow rate. The water cannot enter the hydronic coil 20 due to the water locked loop and check valve sequence.

Upon a call for only domestic hot water without the heating or the air conditioning activated, the flash heater 24 will flash heat the water to a desirable temperature, at which time water will flow to the mixing valve 36 to assure proper temperature and pressure.

Figure 4:
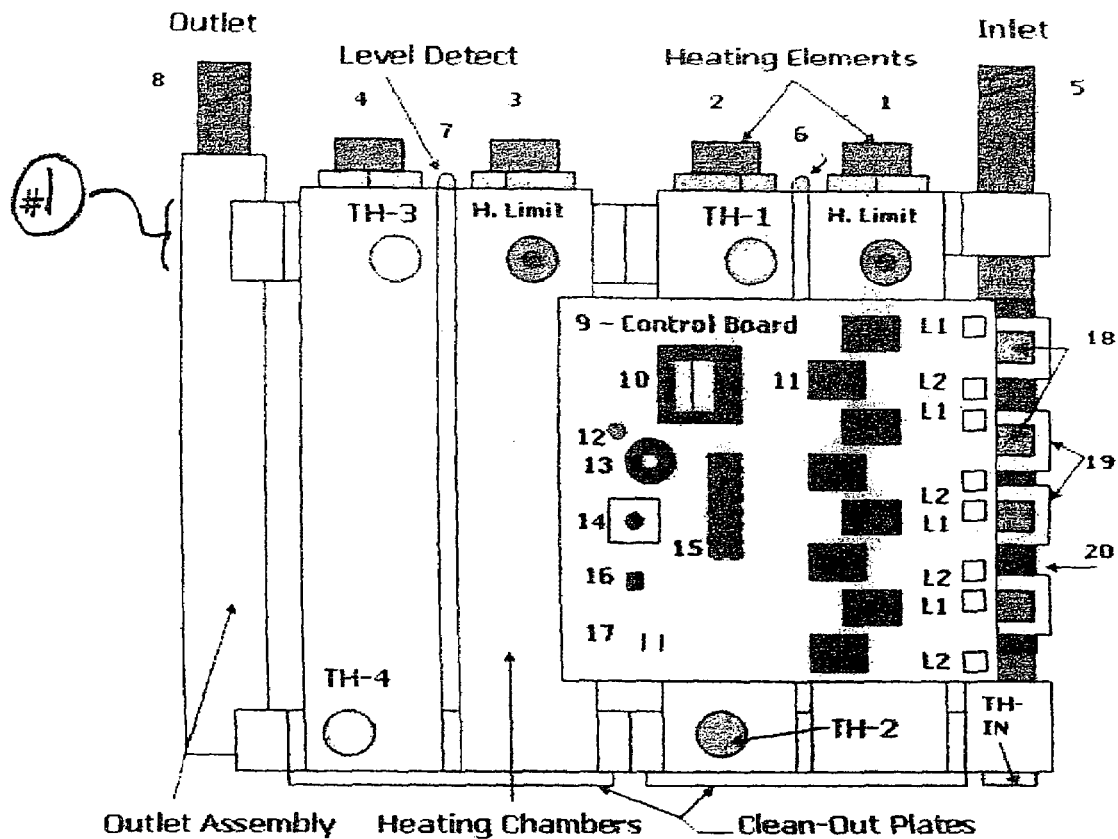
FIG. 4 is a schematic diagram of the flash heater component.
Figure 6:
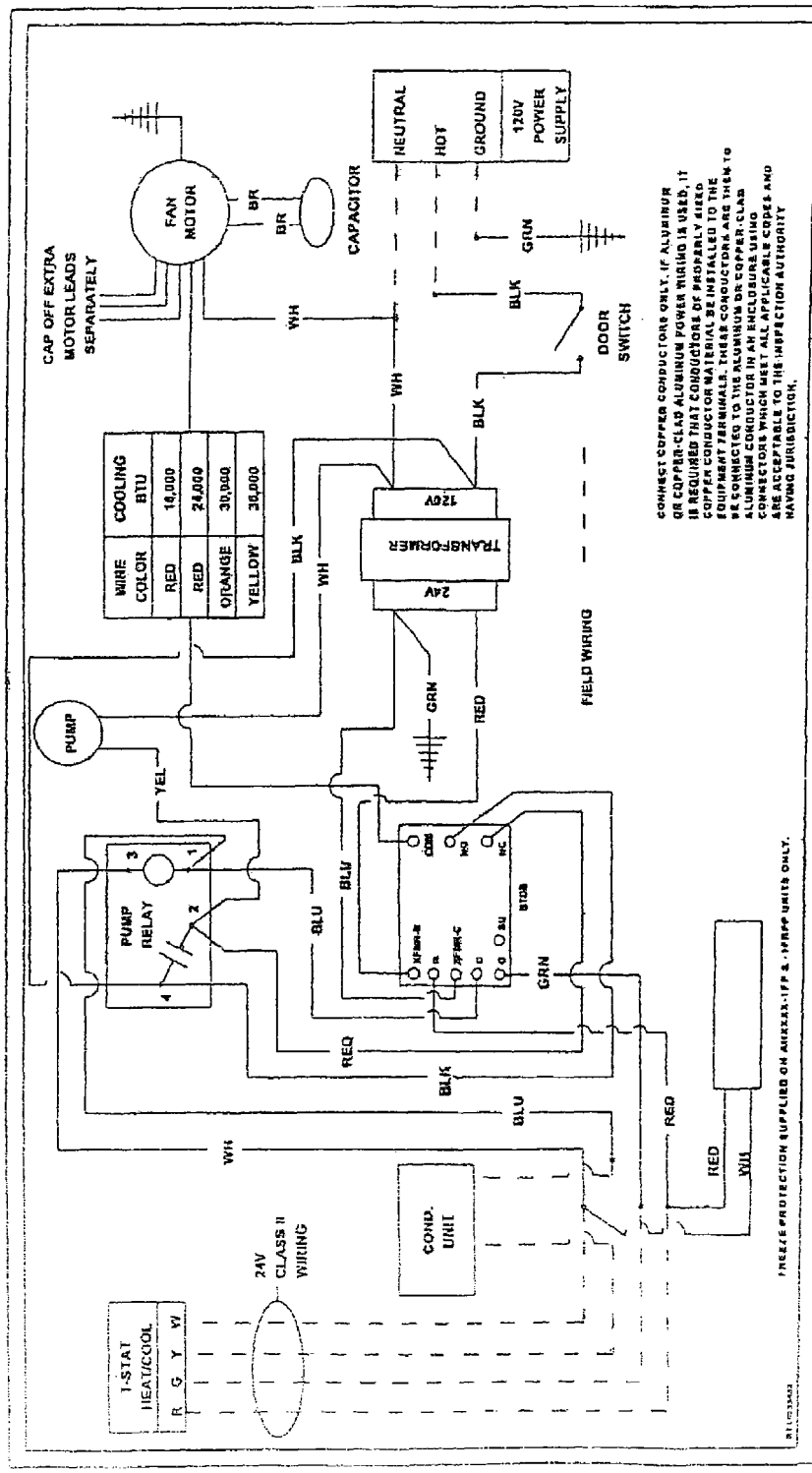
FIG. 6 is the wiring diagram for the present electric forced hot air hydronic furnace.
Figure 10:
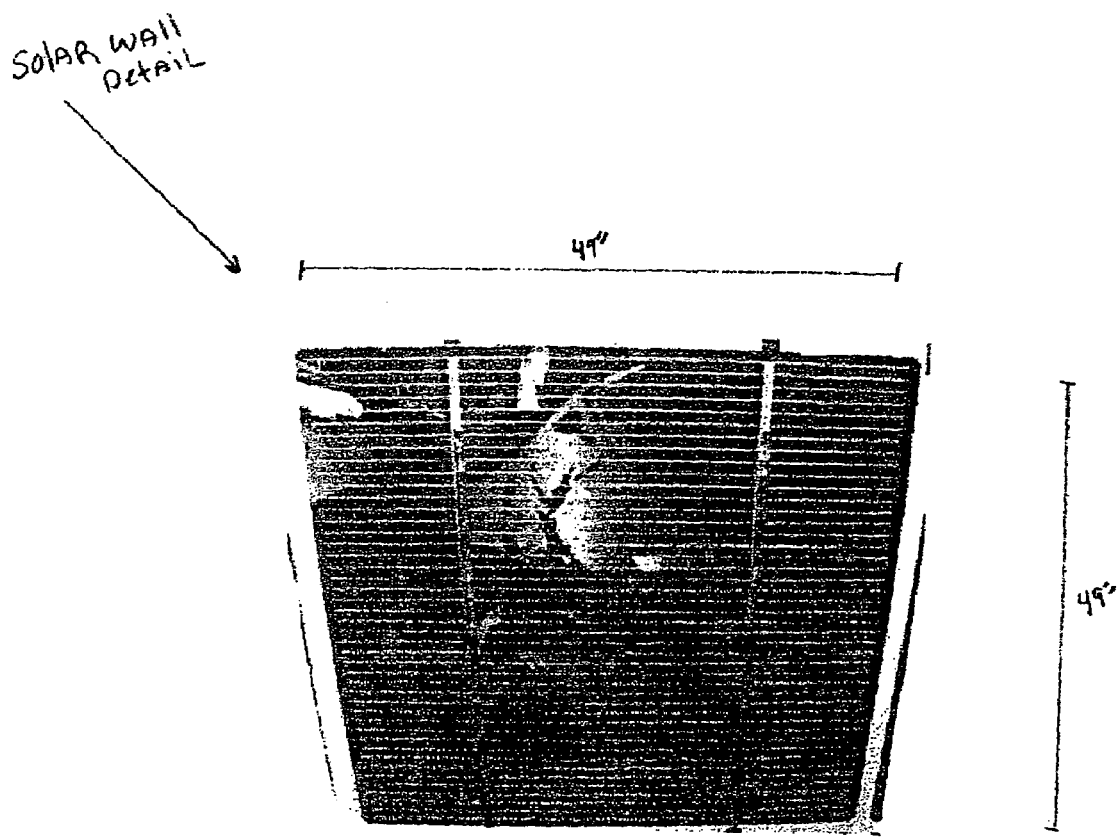
FIG. 10 is a fragmentary front perspective view of a solar panel.

FIG. 4 illustrates schematically a multi-stage heating element of a flash heater, which efficiently uses only the electrical energy required to subsidize the amount of heat necessary to achieve desired water temperature when the heat pump 12 is unable to achieve absolute desired temperature. The difference between the heat absorbed by the water from the condenser coil 14 and the desired water temperature is usually very small during the heating cycles.

TH-1 chamber temperature sensors along with the pressure relief valve 44 (FIG. 1), protect against a danger of excessive temperature or pressure. In addition, the flash heater 24 can only be activated by flowing water, therefore eliminating the chance of excessively heated water or pressure.

The operation of the new furnace 10 has been described earlier in terms of Stage One and Stage Two heating and air conditioning. These stages or modes, as illustrated in FIG. 1, are described more extensively as follows. It being assumed that the ambient temperature is between 20° F. and 70° F. when the heat pump 12 can operate at its highest efficiency.

(1) Mode 1.

The home HVAC system calls for heated air with a typical periodic demand for hot water. The air flow path is shown by: (a) ARROW 50A across the heat pump condenser coil 14 where there is heat transfer into the air; (b) ARROW 50B through the blower 16; (c) ARROW 50C through the hydronic coil heat exchanger 18 where there is heat transfer from the air into the water flowing through the hydronic coil 20 as indicated by ARROW 50D into house air duct system; and (d) then return air flow as indicated by ARROW 50A through the condenser coil 14.

The water flow path is shown by: (a) ARROW 60 for cold water into the furnace 10 from the cold water supply 23; (b) some of this inlet water flows upward as shown by ARROW 60A to the hydronic coil 20 in the hydronic coil heat exchanger 18; (c) the remaining inlet water flows per ARROW 60B from the water supply 23 around to flash heater inlet 26 and thence through the flash heater 24 where it is heated and then per ARROW 60B the heated water flows through exit 28 to the valve 34 which allows hot water to flow either via ARROW 60C from the hydronic coil 20 or via ARROW 60B from the flash heater 24. This hot water from either source, i.e., the hydronic coil 20 or the flash heater 24, if too hot, is mixed by the valve 36 with cold water indicated by ARROW 60D, resulting in domestic hot water flow per ARROW 60E.

(2) Mode 2.

This is similar to Mode 1, except that heat from the heat pump 12 is inadequate for the demand for hot water. This condition is determined by appropriate thermostats and controls, which cause the valve 34 to block flow of water from the hydronic coil 20 and to initiate operation of the flash heater 24 and flow of hot water per ARROW 60B through the valve 34. This is followed by the above-described mixing with cold water as needed to produce the desired temperature of domestic hot water.

(3) Mode 3.

This is similar to Mode 2, however, the heat from the heat pump 12 is insufficient for the heat needed for the forced airflow. Now the hydronic coil heat exchanger 18 is employed to add heat to the airflow, as opposed to transferring heat from the airflow as in Mode 1. Here, the flash heater 24 is activated, heated water flows from outlet 70 of the flash heater 24 via ARROWS 71 to 18A of the hydronic coil heat exchanger 18. This water flow heats the coil 20, which in turn heats the airflow indicated by ARROWS 50C through the heat exchanger 18. As noted above, appropriate thermostatic and pressure controls will be used to adjust valves and operate the heat pump 12 and the flash heater 24 as required.

(4) Mode 4.

This is the air conditioning mode, where: (a) the forced air system demands cooled air; (b) the heat pump 12 will be operated in air conditioning mode; and (c) the return air will be cooled by the condenser coil 14 flow through the blower 16 and through the hydronic coil heat exchanger 18, with no hot or cold water flowing in the hydronic coil 10. In this mode, the flash heater 24 must provide all the heat for domestic hot water.

B. Heating Cost Calculations

Sample calculations for determining the cost of operating the electric forced hot air hydronic furnace 10 to provide the domestic water supply are as follows:

Heat Pump operating at an electrical load of 16.7 RLA× 220 Volts=3.614 KW.

Heat transferred to condenser coil above 20° F. outdoor temperature=36,000 BTU's.

Formula: 3.674 KW=36,000 BTU's of heat.

36,000 BTU's×80% heat transfer to water—excess heat used to warm house.

28,000 BTU's transferred to water heat.

28,000 BTU's will raise the temperature of water approximately 48° F. at a flow rate of 1.5 GPM.

Entering water temperature of 60° F. will rise to 108° F. across the hydronic coil at 1.5 GPM for us as domestic water on-demand.

In comparing two northern homes of the same square footage and insulation factors, we have established the operating cost comparison of the present invention vs. a normal oil fired storage tank for domestic water. The following formula depicts the present invention vs. a forced hot air oil system operating at 70% efficiency burning 4 gallons of oil per day with an estimated cost of oil at $2.65 or $10.60 a day.

1 gallon of oil=140,000 BTU's.

30% less in oil heating: 30% (140,000 BTU)=42,000 BTU.

140,000 BTU's (−) 42,000 BTU's=98,000 BTU's net heat.

98,000 BTU's of net heat×4 gal./day=392,000 BTU's per day required to heat the home.

C. Compared to New Invention

Heat pump will produce 36,000 BTU's per hour.

36,000 BTU's×24 hr/day=864,000 BTU's/24-hour day.

Second Stage subsidized heat from flash heater will not be required if the total load does not exceed 864,000 BTU's per 24 hour period.

D. Cost to Operate Heat Pump 3.674 KW×0.05/KWH=$0.18/KWH.

$0.18/KWH×11 hours to satisfy load b=$1.98.

$1.98 total cost to achieve 392,000 BTU's for the 24-hour period.

11 hours×36,000 BTU's=396,000 BTU's.

E. The Final Equations $1.98/day present invention cost to heat home vs. $10.60/day per oil.

$1.98/day×30 (a month)=$59.40/month for present invention.

$10.60/day×30 days/mo.=$318.00 a month for oil.

F. Comparison Cost Chart

The comparison cost chart shown below demonstrates the remarkably low cost to operate the present invention furnace and produce domestic on-demand hot water, as compared to the cost to operate conventional oil, natural gas, propane, or electrical heaters.

Domestic Hot Water Energy Costs
Stored Hot Water Heater v On-Demand Electric
Forced Hot Air Hydronic Furnace

| Fuel Type/ $ Fuel Price | Energy Produced/ BTU's | Eff % Level Combustion Loss | Storage Loss Est. 60% | Net Used Energy BTU's | Net $ Cost of Used Energy* |
|---|---|---|---|---|---|
| Oil $2.78 Per Gallon | 140,000 BTU's | 80% 28,000 BTU's | 67,200 BTU's | 44,800 BTU's | $3.08 |
| Natural Gas $1.24 per Therm. | 100,000 BTU's | 90% 28,000 BTU's | 54,000 BTU's | 36,000 BTU's | $1.71 |
| Propane $3.68 per Gallon | 100,000 BTU's | 90% 10,000 BTU's | 54,000 BTU's | 36,000 BTU's | $5.09 |
| Electric water tank $.05 per KWH | 3,413 BTU's | 0% 0 | 2,047 BTU's | 1,366 BTU's | $1.83 |
| Electric Forced Hot Air Hydronic Furnace $0.5 per KWH** | 10,000 BTU's | 100%-300% 0 | 0 | 10,000 BTU's | $0.25 |

*Based on a 50,000 BTU day.
**Heat Pump operating on 3.6 KW = 36,000 BTU's

G. Second Embodiment

The second embodiment, as seen in FIG. 16, utilizes solar panels clad onto a heat pump to provide electrical power, which is accumulated in net metering, while the heat pump provides heat or cooling as described in the first embodiment above.

With the rebates and tax incentives provided by federal, state, and city agencies for use of solar panels and energy conserving and pollution free heat pumps, the net cost to users of the present invention is startling low, and is so low that the net cost after installation and use would be a free unit, i.e., $1,454 credit for installation and approximately 10 million BTUH of free heating, air conditioning, and hot water annually.

FIGS. 8 and 9 show a heat pump 80 with its top 81 and sides 82, 83, 84 and 85. The sides 82 and 83 are inclined slightly upward and face the sun during the course of the day.

Condenser coil is seen on side 84. The evaporation coil is not seen, but would be located in the first heat exchanger of the new furnace as seen schematically in FIG. 8.

Wiring diagrams correspond to FIGS. 2 and 4, respectively, for the first embodiment described above.

FIG. 16 is a schematic drawing of a solar wall as used herein.

H. Conclusions

The present invention comprises both the furnace and the method of producing on-demand hot water and/or heated air for HVAC.

In the preferred embodiments of the present invention, the furnace includes standard components well known in the HVAC industry and sized by a person skilled in this field to be operable and compatible in the new arrangement, with the heat pump condenser coils situated in the path of return recirculated air, and with an appropriate blower, hydronic coil heat exchanger, and electrical flash heater.

It is to be understood that although the preferred embodiments are described for a residential system, principles herein are likewise applicable to commercial and otherwise larger or smaller HVAC and hot water systems.

While the invention has been described with reference to particular embodiments, it is to be understood by those skilled in the art that modifications and variations can be effected within the spirit and scope of the invention as previously described and as defined by the claims.

The invention claimed is:

1. An electric forced air hydronic furnace for heating water for an on-demand hot water supply system and operatively connected to a cold water supply and a recirculating air flow through a continuous air duct system, comprising:
   a) a heat pump;
   b) a first hear exchanger having a condenser coil;
   c) a second heat exchanger;
   d) a blower; and
   e) a controller;
   wherein said heat pump has a first heat exchange element;
   wherein said heat pump includes said condenser coil;
   wherein said condenser coil emits heat;
   wherein said first heat exchanger receives air from an inlet;
   wherein said first heat exchanger includes said condenser coil of said heat pump as a heat source;
   wherein said second heat exchanger receives air from said first heat exchanger;
   wherein said second heat exchanger includes a hydronic heat exchanger coil through which flows water to be heated so as to allow the air to be heated in said first heat exchanger and to reject heat to the water in said second heat exchanger;
   wherein said blower is for forcing the recirculating air through said first and second heat exchangers and through the air duct system; and
   wherein said controller operates said heat pump when heat is needed to heat the water in said second heat exchanger.

2. The furnace of claim 1, wherein said heat pump has a refrigeration mode; and
   wherein said heat pump, when in said refrigeration mode thereof, has said first heat exchange element thereof function as an evaporation coil to provide refrigeration to air flow through said first heat exchanger so as to form refrigerated air that then flows into the air duct system.

3. The furnace of claim 1, further comprising:
   a) an electric flash heater; and
   b) a first valve and a first automatic control;
   wherein said electric flash heater is for heating on-demand hot water; and
   wherein said first valve and said first automatic control direct the cold water to be heated first to said second heat exchanger and then to said flash heater if said second heat exchanger has insufficient heating capacity at that time.

4. The furnace of claim 3, further comprising a second valve and a second automatic control;
   wherein said second heat exchanger has a hydronic coil; and
   wherein said second valve and said second automatic control responds to a demand for hot water by first activating said heat pump and thereby obtain heat transferred into the air flow in said first heat exchanger, and then if there is insufficient heat from said heat pump, activates said flash heater to direct hot water to said hydronic coil in said second heat exchanger from which there will be heat transfer into the air flow through said second heat exchanger so as to form a heat transfer with a heat transfer efficiency.

5. The furnace of claim 1, wherein said heat pump has an efficiency; and
   wherein said heat transfer to said second heat exchanger occurs with substantially the same heat transfer efficiency as said efficiency of said heat pump.

6. The furnace of claim 5, wherein said heat pump has an operating cost; and
   wherein said heat transfer to the water flow has a cost essentially no greater than said operating cost of said heat pump.

7. The furnace of claim 1, further comprising a set of solar panels;
   wherein said heat pump has a top and two sides;
   wherein said set of solar panels are coupled to said heat pump and situated on said top and said two sides of said heat pump for exposure to overhead and Southern direction sunlight;
   wherein said set of solar panels function as an electric current source for reverse current flow into a power grid for net metering when said furnace has no demand for operation of said heat pump; and
   wherein said heat pump draws current normally from the power grid when said furnace signals a demand for operation of said heat pump to produce one of heat and refrigeration.

8. The furnace of claim 7, wherein said set of solar panels have a capacity to generate electric current, which when directed into the power grid achieves stored credits that are sufficient to substantially pay for current demanded by said heat pump during normal operation of said heat pump.

* * * * *